United States Patent [19]

Dobson et al.

[11] Patent Number: 4,980,032

[45] Date of Patent: Dec. 25, 1990

[54] DISTILLATION METHOD AND APPARATUS FOR REPROCESSING SULFURIC ACID

[75] Inventors: Jesse C. Dobson; Marshall McCormick, both of Oakland, Calif.

[73] Assignee: Alameda Instruments, Inc., Pleasanton, Calif.

[21] Appl. No.: 231,849

[22] Filed: Aug. 12, 1988

[51] Int. Cl.$^5$ .................. B01D 3/10; C01B 17/90
[52] U.S. Cl. ........................ 203/40; 203/12; 203/77; 203/80; 203/86; 203/DIG. 2; 203/DIG. 9; 134/12; 156/642; 159/47.3; 159/DIG. 15; 159/DIG. 19; 202/154; 202/159; 202/185.6; 202/197; 202/205; 202/267.1; 423/531
[58] Field of Search ............ 203/12, 73, 74, 80, 203/40, 77, DIG. 2, 86, DIG. 16, DIG. 9; 202/154, 158, 159, 197, 267.1, 185.6, 205, 198; 423/531, 525, 526, 529; 156/642; 159/47.3, DIG. 19, DIG. 15; 134/12

[56] References Cited

U.S. PATENT DOCUMENTS

| | | |
|---|---|---|
| 556,040 | 3/1896 | Alberger .................. 159/DIG. 15 |
| 1,903,408 | 4/1933 | Soll ................................ 203/29 |
| 2,485,048 | 10/1949 | Guinot ............................ 202/154 |
| 2,993,757 | 7/1961 | Dasher et al. ................... 423/484 |
| 3,166,379 | 1/1965 | Bradley et al. ................. 423/484 |
| 3,271,273 | 9/1966 | Fox et al. .......................... 203/12 |
| 3,294,650 | 12/1966 | Manteufel ................... 159/DIG. 19 |
| 3,342,703 | 9/1967 | Leach ................................ 203/4 |
| 3,689,370 | 9/1972 | Osaka et al. ..................... 203/33 |
| 3,696,003 | 10/1972 | Fitch et al. ........................ 203/4 |
| 3,839,534 | 10/1974 | Matsumoto et al. ............. 156/642 |
| 3,933,575 | 1/1976 | Guth ............................... 423/531 |
| 3,972,987 | 8/1976 | von Plessen et al. ........... 423/531 |
| 4,008,130 | 2/1977 | Leathers et al. ................... 203/53 |
| 4,045,295 | 8/1977 | Schafer et al. .................. 423/531 |
| 4,125,594 | 11/1978 | Su et al. ........................... 156/642 |
| 4,138,309 | 2/1979 | Kuhnlein et al. ........... 159/DIG. 15 |
| 4,160,692 | 7/1979 | Mitchell .................... 159/DIG. 15 |
| 4,233,281 | 11/1980 | Hirko et al. ....................... 203/12 |
| 4,235,677 | 11/1980 | Karamian .......................... 203/86 |
| 4,329,155 | 5/1982 | Schlegel .......................... 203/12 |
| 4,395,302 | 7/1983 | Courduvelis ..................... 156/642 |
| 4,406,745 | 9/1983 | Martel ............................. 202/197 |
| 4,409,064 | 11/1983 | Vora et al. ....................... 202/197 |
| 4,584,062 | 4/1986 | Sussmeyer et al. ............. 202/197 |
| 4,655,879 | 4/1987 | Brockmann et al. .............. 203/99 |
| 4,828,660 | 5/1989 | Clark et al. ....................... 204/82 |
| 4,855,023 | 8/1989 | Clark et al. ..................... 204/130 |

FOREIGN PATENT DOCUMENTS

139306 10/1960 U.S.S.R. ......................... 423/484

Primary Examiner—Wilbur Bascomb
Attorney, Agent, or Firm—Blakely, Sokoloff, Taylor & Zafman

[57] ABSTRACT

An apparatus and method for reprocessing waste piranha containing contaminated $H_2SO_4$ from, for example, a semiconductor processing operation is described. The apparatus and method include a first distillation flask which are maintained under a substantial vacuum. The first distillation flask includes a first column with a column packing means and a reflux means to retard loss of $H_2SO_4$ in the first distillation. The second distillation flask boils off substantially pure $H_2SO_4$ through a column which is coupled to a condenser which condenses substantially pure $H_2SO_4$.

8 Claims, 8 Drawing Sheets

FIG-4

FIG_5

FIG. 7

FIG_8

TOTAL VAPOR PRESSURE VS. TEMPERATURE AND CONCENTRATION OF $H_2O - H_2SO_4$ SOLUTIONS

DISTILLATION METHOD AND APPARATUS FOR REPROCESSING SULFURIC ACID

BACKGROUND OF THE INVENTION

1. Field of the Invention.

This invention relates to acid reprocessing and more particularly, to a double distillation reprocessing of spent piranha acid to obtain semiconductor grade sulfuric acid ($H_2SO_4$).

2. Prior Art.

Various methods for reprocessing acid are known, with double distillation being reasonably well known. Double distillation may be used when reprocessing spent piranha acid which is a combination of $H_2SO_4$ and an oxidant, such as $H_2O_2$. In the semiconductor integrated circuit manufacturing industry this combination (piranha acid) is used to clean wafers and strip the photoresists.

The corrosive and toxic nature of the cleaning and stripping acids (e.g., $H_2SO_4$) presents several problems. First, the problem of disposal is an economic problem as well as an environmental problem. Economically, it is costly to properly dispose of spent acid. Strict environmental control must be maintained. Even when environmental regulations are observed and strictly complied with, there is always the possibility of environmental pollution. Spilled acid travels quickly through the ground layer resulting in contamination of the aquifer and eventually reaches the ground water. In addition to the downward movement, a spill can creep through the ground sideways, thus creating a growing contamination. In addition to the damaged environment, the liability cost associated with a hazardous waste clean-up is high, thus resulting in an even greater economic loss. Second, the piranha acid can only be used once and when spent must be discarded, thereby requiring purchase of additional acid. This is costly and restarts the disposal cycle.

Alternatively, piranha acid can be reprocessed, thus breaking this economically and environmentally costly cycle. While acid reprocessing appears clearly to be a viable alternative, any acceptable process must produce $H_2SO_4$ of sufficient purity to exceed the semiconductor industry standards for sulfuric acid. The industry requires $H_2SO_4$ to be extremely pure, with total metallic impurities being less than 500 ppb, typically much less. Particulate matter resulting from the cleansing of wafers and stripping of photoresist must also be minimized. Precise understanding of the source of particles in the liquid is as yet unrealized. However, small amounts of particulates can significantly reduce the yield of semiconductor chips. For example, during the photolithographic process, small particulates can adhere to the wafer and result in the loss of a transistor or a conductor line, thereby resulting in a low yield, i.e. an increased loss of functional chips per wafer. Contaminates are even more disastrous when the process is used for VLSI fabrication.

It is believed that the high particulate count probably partially results from the necessity of using high boiling temperatures in a second stage of a double distillation process. Double distillation is a process used to purify acids and has been an established technology for approximately 30 years. In the first distillation, low boiling compounds, such as water, carbon dioxide and unreduced compounds are distilled off from the acid. The acid, having a higher boiling point, remains in the distillation mixture and is transferred to the second distillation stage. The distillation mixture transferred to the second stage contains the higher boiling point acid and other high boiling point compounds, such as heavy metal contamination and particulate.

Theoretically, these contaminants remain in the distillation vessel after the high purity acid is distilled off. However, in practice, a small portion of these contaminants and particulates are distilled off. The particulates escape the liquid phase of the mixture and are carried over into the distillation column in the prior art second stage distillation along with the gaseous $H_2SO_4$.

Accordingly, considerable effort has been directed to devising a process that reduces this carry over improving the purity of $H_2SO_4$. In particular, much effort has been directed at evolving a process that decreases the particulate matter and other contaminants.

SUMMARY OF THE PRESENT INVENTION

An acid reprocessor apparatus and process for reprocessing piranha (waste) acid from a semiconductor wafer cleaning and etching process is described.

The waste acid is processed through double distillation, thereby increasing the purity of the product $H_2SO_4$ to meet semiconductor grade standards. Further, the double distillation process maximizes the purity of the product. Reducing the pressure advantageously employs a proportional relationship between pressure and temperature. Since the boiling point of a material is reduced as the pressure is decreased, safer temperatures may be maintained. In the first distillation, a distillation flask means is operated at the boiling point of relatively dilute (typically 80-95%) $H_2SO_4$. However, to assure that $H_2SO_4$ is not distilled at this first step, dilute acid is trickled through the column of the distillation flask means thus removing gaseous $H_2SO_4$ from the distillation vapor.

Once the lower boiling compounds are removed from the distillation mixture and the acid is at the proper concentration, the mixture is transferred to a second distillation flask means. At this point the enriched feed is heated to reach the boiling point of $H_2SO_4$, which has been reduced by decreasing the pressure to approximately 5 Torr in the second distillation flask means. Decreasing the pressure reduces the boiling point of the $H_2SO_4$. The reduction of the temperature causes the chemical activity differential between the product $H_2SO_4$ and the higher boiling metallic impurities to increase (i.e. the difference between the chemical activity of $H_2SO_4$ and the chemical activity of higher boiling metallic impurities increases), thus ensuring a purer product because of reduced level of these impurities.

As the gaseous $H_2SO_4$ exits the second distillation flask means, a small amount of the second distillation flask contents is continuously transferred into the sludge reservoir and periodically removed from the system via a receiving tank. The $H_2SO_4$ vapor from the second distillation flask means is liquified through a condenser. A self-contained, recycled coolant system is maintained through the condenser. The reprocessing system provides for further recycling if the quality assurance system indicates that the product is not within the required specifications. In addition to the safer conditions of lower operating temperatures, the system is maintained with numerous temperature sensors and liquid level monitors which will indicate any safety threatening problems. Multiple alarms are triggered when such problems arise as well as when product readings are out of specification.

The process and apparatus of the invention yields more purified $H_2SO_4$ (relative to the prior art) because the terminal velocity of the particulate contaminants are decreased by the vacuum in the second distillation stage. Moreover, the use of a vacuum in the second stage of distillation permits the reduction of the temperatures required to vaporize the $H_2SO_4$; therefore, less expensive equipment may be utilized in the apparatus of the invention relative to prior art apparati. The lower temperatures also reduce the wear and disintegration on the equipment and, therefore, improve the reliability of the equipment.

BRIEF DESCRIPTION OF THE DRAWINGS

FIG. 6 is a detailed schematic representation of the vacuum pump system.

DETAILED DESCRIPTION OF THE PRESENT INVENTION

A piranha acid double distillation reprocessing method and apparatus which provides for semiconductor grade $H_2SO_4$ at lowered temperatures and decreased pressures is described. In the following description, numerous specific details are set forth such as specific temperatures, pressures, materials, etc., in order to provide a thorough understanding of the present invention. It will be obvious, however, to one skilled in the art that the present invention may be practiced without these specific details. In other instances, well known techniques and devices have not been described in detail in order not to unnecessarily obscure the present invention.

Figure 1:
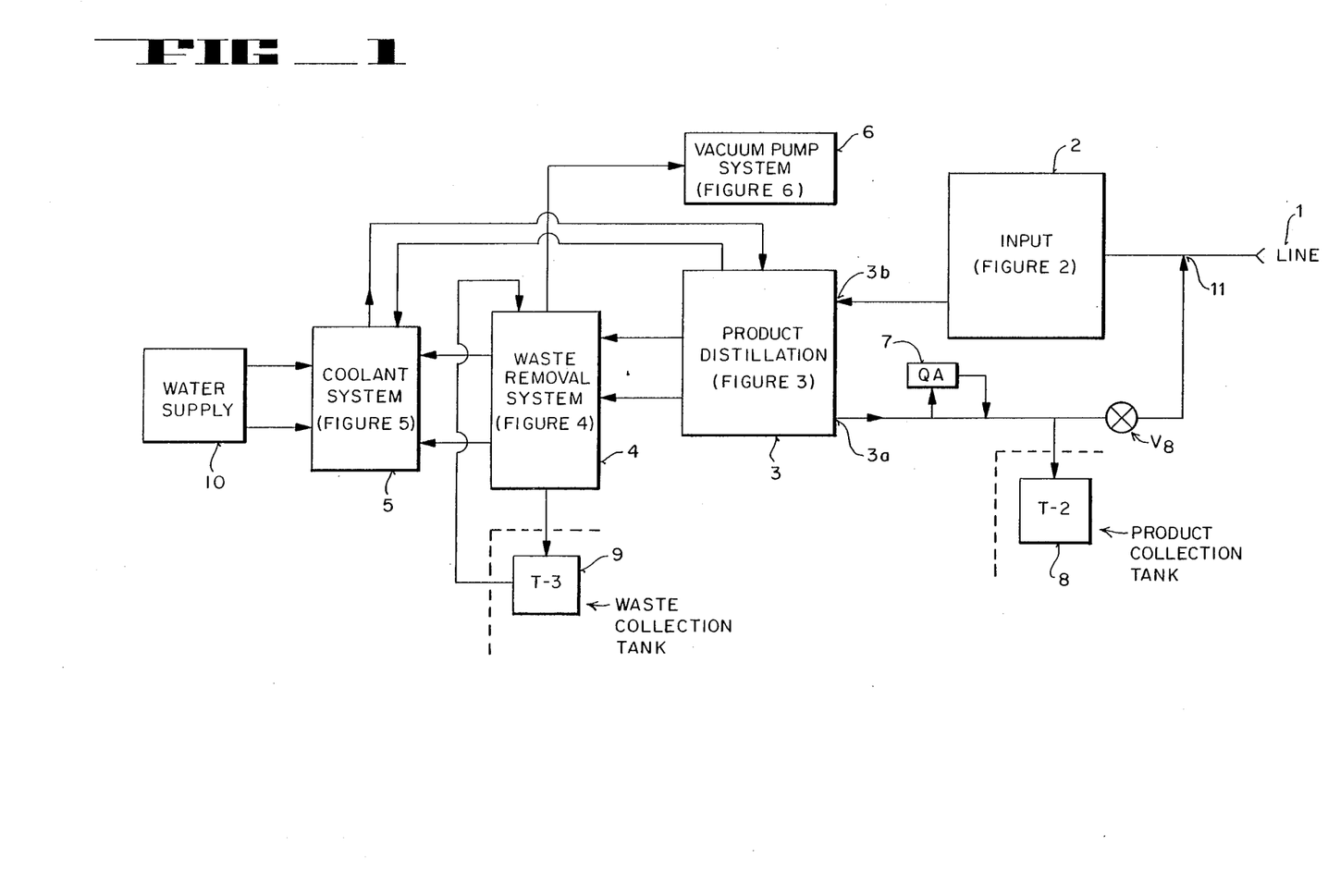
FIG. 1 is a block diagram of the piranha acid reprocessing system.

In FIG. 1, a piranha reprocessing system is schematically represented. The spent piranha acid ("feed") is introduced to the system via the input line 1. The feed enters the preliminary preparation apparatus 2 ("input section") where the temperature is stabilized. Level controllers and temperatures sensors are also provided in the input section. Once a prespecified temperature and level in the receiving flask is reached, the feed is drained into the product distillation system 3 shown in FIG. 1. It is during this phase of reprocessing that the pressure is decreased and the temperature is further increased. Prior to the junction at 3b as shown in FIG. 1, the operation is conducted at atmospheric pressure.

From the product distillation system 3 in FIG. 1, purified $H_2SO_4$ ("product") is removed to the receiving tank 8 or recycled at junction 11 (by opening valve $V_8$) depending on the analysis from the quality assurance system loop 7. Also from the product distillation system 3, gaseous water and liquid waste acid and heavy metal contaminants and particulates ("sludge") are removed into the waste removal system 4. The sludge is drained from the sludge reservoir in the removal system 4 to a waste collection tank 9 ("T-3").

The coolant system 5 is a self contained unit which is used to vary the temperature of the coolant in the condenser of the product distillation system 3. A water supply 10 cools the heat exchanger of the waste removal system 4.

The pump system 6 provides a vacuum in certain structures in product distillation system 3 and waste removal system 4. While the pump system is also connected to the preliminary preparation system 2, the connected lines are activated only to purge the system, since as previously indicated the preliminary preparation system 2 is at atmospheric pressure (while structures in the product distillation system 3 are at substantially vacuum pressures).

To completely describe the process and apparatus of the present invention, it is necessary to describe in detail the requisite apparatus and its operation. Therefore, Part I is a detailed description of the apparatus and refers generally to FIGS. 2–7. Part II is a detailed description of the operation of the apparatus and covers the following operations: start-up sequence; idling sequence; normal operations; auto-recycling sequence; quality assurance sequence and safety alarm provisions.

PART I

General Features of the Apparatus

Referring to FIGS. 2–7, the valves V1–V22 are selectively opened and closed to control the direction of the flow and the ultimate destination of gases and fluids. In addition to flow regulation via opening and closing of the valves V1–V22, the flow rate may be monitored by a flow measurement device such as the flow measurement device attached to line 108 in FIG. 4. The valves V1–V22 may be controlled manually by a series of separate switches or combination of switches that the user may use to shut down the apparatus systematically.

Liquid level monitors and temperature sensors may be integrated into a system alarm to indicate unusual or dangerous conditions. The temperature sensors may be a thermocouple with a preset temperature and may be interfaced with a shut down mechanism on a heating system such that once the predetermined temperature is reached, the heating system is shut down. Moreover, the temperature sensors may be an integral part of heating systems which automatically maintain a temperature which is set by the user of the heating systems; such systems are commercially available. The level sensors used with the apparatus of the invention are conventional, commercially available level sensors (e.g. acoustical/ultrasound or optical liquid level sensors). The temperature monitors and liquid level monitors allows the user to continuously check if the system is within the desired ranges.

Figure 2:
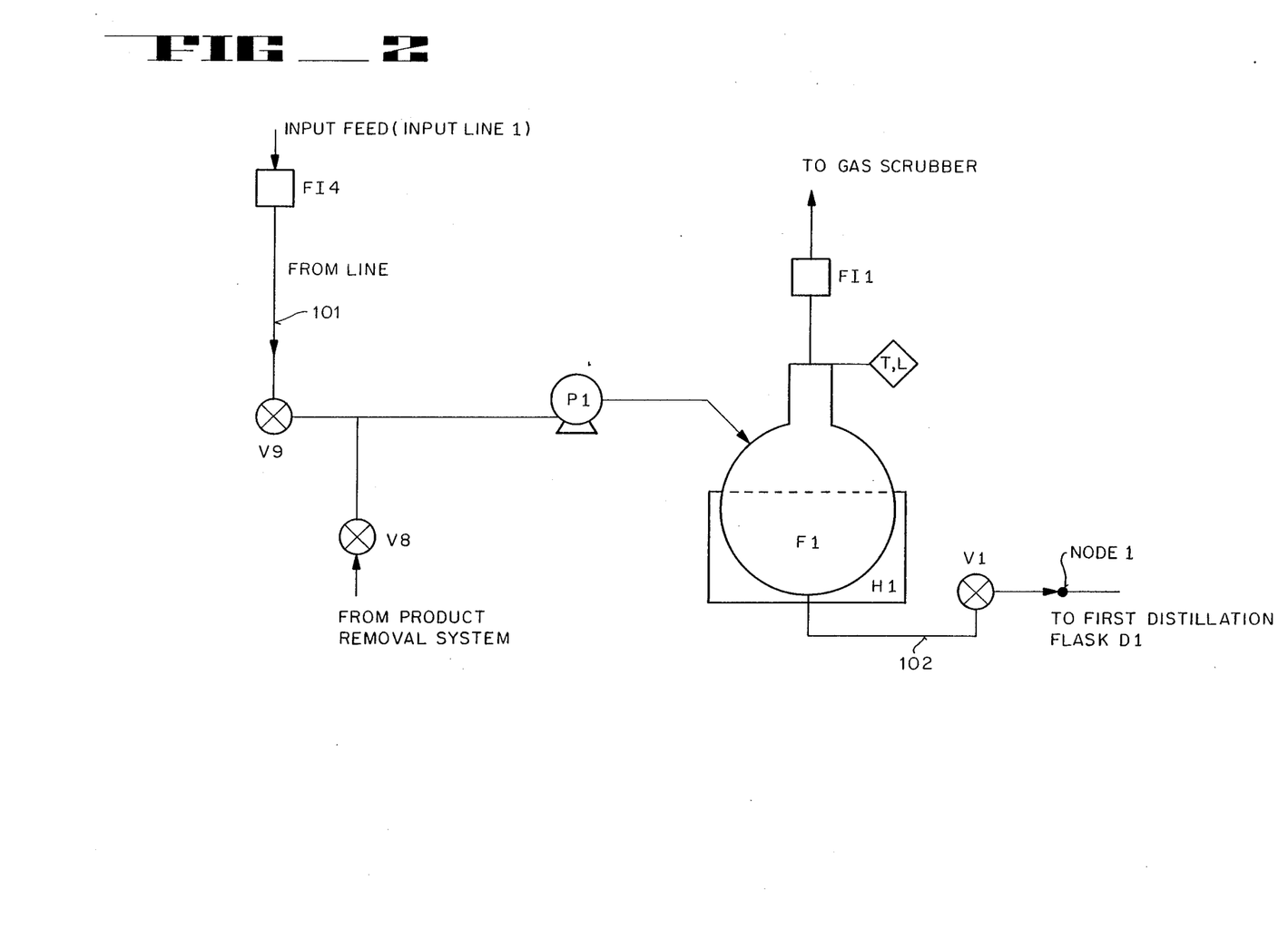
FIG. 2 is a detailed schematic representation of the preliminary preparation apparatus prior to distillation.
Figure 4:
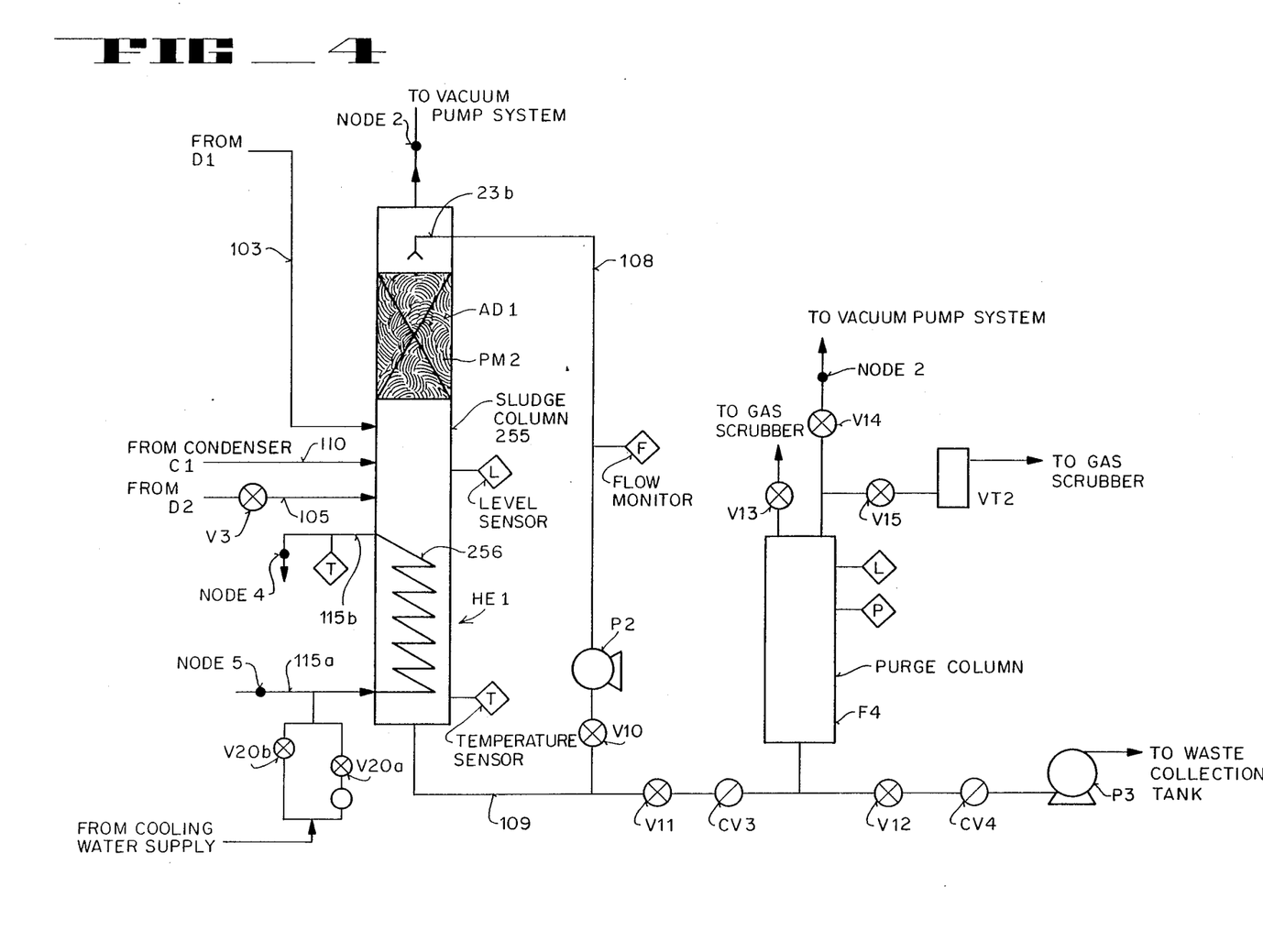
FIG. 4 is a detailed schematic representation of the apparatus employed for contaminant removal.
Figure 5:
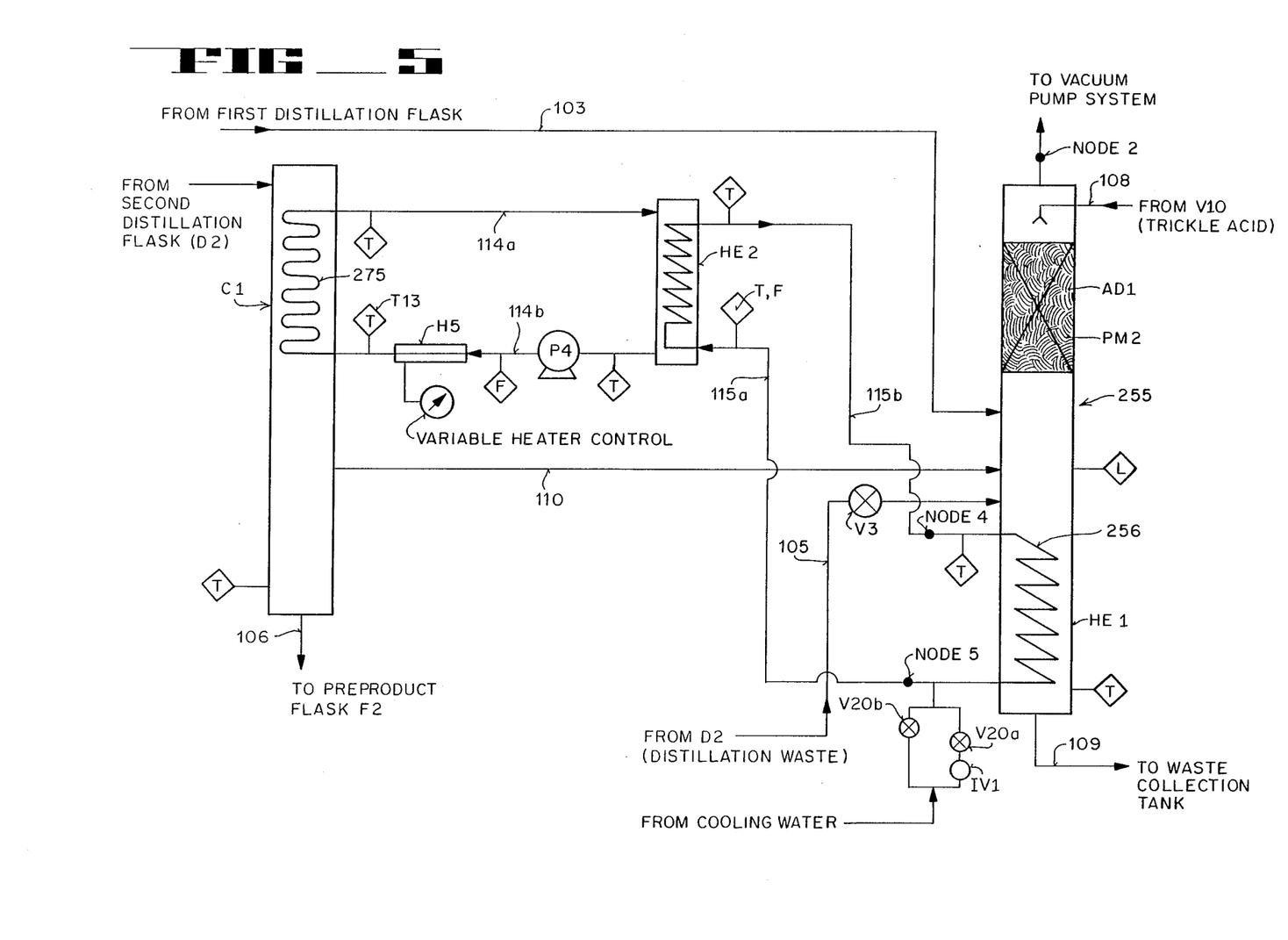
FIG. 5 is a detailed schematic representation of the coolant system in the apparatus.

Referring to FIGS. 2, 4, 5 and 6, several pumps P1, P2, P3, P4 and P5 are shown. The pumps P1–P4 as shown in FIGS. 2, 4 and 5 are simple feed pumps. For example, pump P1 as indicated in FIG. 2 may be used to drive the feed forward to the input line 1. Pump P2 as shown in FIG. 4 is used to drive liquid $H_2SO_4$ from the output of the heat exchanger HE1 to the top of the absorption column AD1. Pump P3 as indicated in FIG. 4 is used to drive deposited waste acid into a waste collection tank. Pump P4 may be a single stage rotary pump as shown in FIG. 5 which may be employed to circulate coolant through a self-contained system. These pumps are conventional, commercially available items.

The fifth pump, P5, is shown in FIG. 6 and is required to evacuate the apparatus to pressure levels of 5–10 Torr. This may be accomplished by using a simple conventional vacuum pump, such as an oil pump as in the present embodiment.

The nodes (e.g. Node 1) merely identify the points of interconnection between the various figures and are shown for the convenience of the reader. For example, it will be understood that Node 1 of FIG. 2 is connected to Node 1 of FIG. 3 and therefore, spent piranha from flask F1 of FIG. 2 is conveyed through a pipe means ("line") 102 to the first distillation flask means D1. It will be understood that liquids are transferred from one vessel to the next vessel by gravity feed where pumps are not shown. For example, gravity feed will provide the mechanism for transfer from vessel D1 to vessel D2 and for the transfer from sludge column 255 to purge column F4.

A. Preliminary Preparation System Apparatus (Input Section)

FIG. 2 shows a detailed representation of the input system 2 of FIG. 1. The input line 1 may be a pipe means ("line") which can be constructed from noncorrodible material such as Teflon® or Kynar® or any other similar materials. It will be appreciated that the other lines shown in FIGS. 2–7 are also pipe means which may be constructed from Teflon® or conventional borosilicate glass (e.g., Pyrex®); these pipe means are used to couple the various components (flasks, distillers, etc.). The initial filter FI4, with a pore size of 100 microns in the preferred embodiment, eliminates the majority of particles in the feed. Of course, it cannot eliminate particles created from further processing, such as the processing in the first distillation stage.

A simple pump P1 is positioned between valve V9 and the primary receiving flask F1 (input flask means). The primary receiving flask F1 may be constructed from any heat and chemical resisting material; however, borosilicate glass (e.g. Pyrex® glass) is used in the preferred embodiment. Advantageously, flask F1 is coupled to a liquid level sensor and to a temperature sensor. The spent piranha is fed into the primary flask F1 from the line 101 through valve V9. The piranha in the primary flask F1 is heated by a heating means H1, such as a heating mantle in the present embodiment. The temperature of the piranha in flask F1 is typically maintained at approximately 175° C. The liquid level and temperature is monitored and regulated from the level sensor and temperature sensor which are attached to flask F1.

B. Product Distillation System

Figure 3:
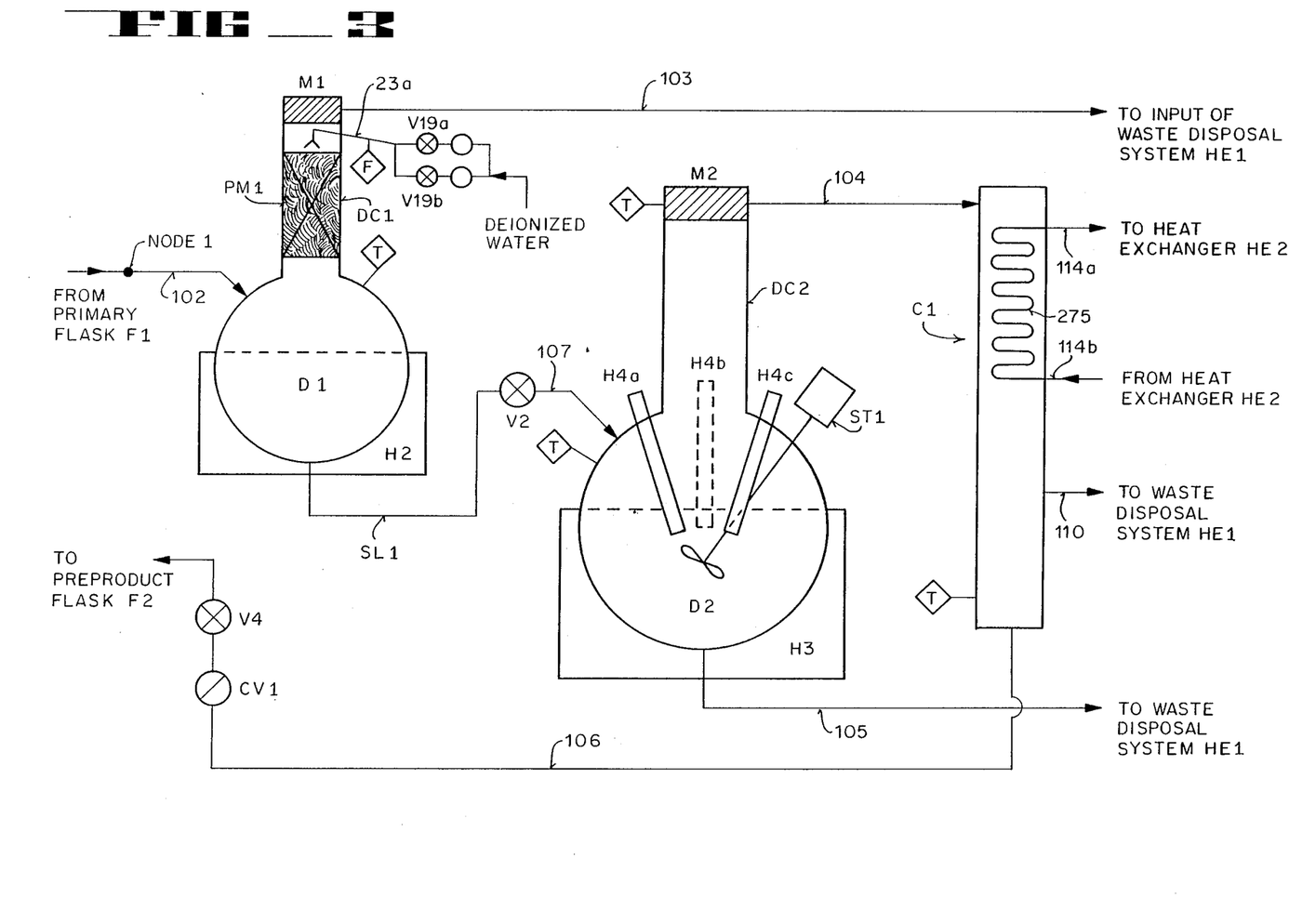
FIG. 3 is a detailed schematic representation of the double distillation apparatus.

The apparatus shown in FIG. 3 comprises the product distillation system 3 of FIG. 1. The feed exiting from the primary flask F1 through valve V1 is transferred to a distillation vessel D1 (first distillation means) via line 102 and is heated in the vessel D1 by a heating means H2, such as a heating mantle as in the present embodiment. The heating means H2 is typically an automatically regulated heating device, the temperature of which is controlled based upon the temperature setting selected by the user and upon the output from a temperature sensor. Such heating means are commercially available. The heating means H2 periodically heats the vessel D1 to the requisite temperature (e.g. a temperature in the range of 200° F. to 300° F.) as specified by temperature sensor and the user selected temperature setting. The top of the vessel includes a gaseous output and is capped with a packed distillation column DC1; that is, the distillation column is packed with a column packing means PM1. Although Rashig rings are used as the packing material PM1 in the column in the preferred embodiment, other suitable column packings such as Lessing rings or glass beads may also be used. An input pipe 23a, for reflux liquid (e.g. deionized water), is located near the top of the distillation column DC1 above the column packing material but below a mist eliminator M1. Line 103 is coupled to mist eliminator means M1. Reflux liquid is discharged from the input pipe 23a and trickles over and through the packed column DC1. A source of de-ionized water is maintained under a vacuum and is coupled to valves V19a and V19b; the de-ionized water is supplied to input pipe 23a through valves 19a and 19b. The vapor outlet, located at the upper-most portion of the column DC1 along with a mist eliminator M1, is coupled to the waste disposal system 4 of FIG. 4 through line 103. The mist eliminator M1 is essentially a deatomizer removing any particles or condensation from the vapor, thus ensuring that only the desired vapor from the distillation mixture is inputted to the waste output system 4. Mist eliminator means M1 may be comprised of glass wool or other suitable means for removing particles and condensed water droplets from the gaseous water leaving D1. The line SL1 of the distillation vessel D1 provides a means for transferring the distillation mixture containing the partially purified $H_2SO_4$ to a second distillation means vessel D2 through valve V2 and line 107, thus providing careful regulation of the transfer between the first and second distillation vessels. The vessel D1 and the column DC1 may be constructed from borosilicate glass such as Pyrex®.

The second distillation vessel D2 (second distillation means) is similar to the vessel D1. D2 is also seated in a heating means, such as a heating mantle H2, which heats the distillation mixture to a temperature higher than that of vessel D1. An attached temperature sensor is used to control and monitor the temperature within the distillation vessel D2. The vessel D2 includes an input which is coupled to line 107. The distillation vessel D2 is capped by a distillation column DC2. Unlike the distillation column of D1, there is no deionized water trickle input pipe at the top of the distillation column for D2. However, there is a vapor outlet which is coupled through a mist eliminator M2 to the tubular shell of the condenser C1. An outlet located near the bottom of distillation vessel D2 provides for the release of the remaining sludge mixture in vessel D2 which flows, through line 105, to the waste disposal system of FIG. 4 when the valve V3 is open.

The product ($H_2SO_4$) in its gaseous state travels through line 104 and enters the tubular shell (e.g. glass jacket) of condenser C1 where it is cooled to its liquid state by the coolant flowing through the coil 275 of the condenser C1 and then it collects in the lower portion of condenser C1 until it overflows into the pre-product vessel flask F2. The product then proceeds through check valve CV1, valve V4 and into the pre-product vessel F2 shown in FIG. 7. The vessel D2, the column DC2 and the condenser C1 may be constructed from borosilicate glass, such as Pyrex ®.

C. Waste Disposal System

The waste disposal system 4 is shown in FIG. 4. This system is comprised of a purge column F4 and a sludge column 255 which includes a heat exchanger means HE1. The sludge column 255 receives inputs from the distillation column DC1 through line 103, the condenser C1 through line 110, and the distillation vessel D2 through line 105. The heat exchanger means HE1 is positioned in such a manner as to allow the heat exchanger HE1 to fill to a level controlled by the filling of distillation flask D2 and valve V3. The level of sludge may be carefully monitored by a liquid level sensor attached to sludge column 255 and may be controlled by opening and closing valve V3. The sludge column 255 also includes an absorption column AD1. Although, the packing material of the column AD1 is Rashig rings in the preferred embodiment, any other suitable packing material PM2 such as Lessing rings or glass beads may be used.

The sludge exiting line 105 into the heat exchangers HE1 passes over the coils 256 of the heat exchanger HE1 and is cooled by the cool water flowing through the coil 256. The coil 256 of the heat exchanger HE1 is filled with cooling water, which flows through a closed loop (via lines 115a and 115b) which is temperature controlled through the exchanger HE2 shown in FIG. 5. The sludge, which is under vacuum in the sludge column during normal distillation processing, will collect within the tubular shell of HE1 until drained periodically into the purge column F4, which is also under vacuum during normal distillation processing. The purge column F4 may be drained while continuing an ongoing distillation (under vacuum in vessels D1, D2, C1 and the sludge column 255) by closing valve 11 and allowing the purge column F4 to come to atmospheric pressure (by closing valve V14 and opening valve V13) and then by pumping the sludge out of purge column F4 by pump P3 through momentarily opened valves V12 and CV4 and into a waste collection tank. The purge column F4 may be filled from the sludge column 255 while continuing an ongoing distillation by opening valve V11 while the purge column F4 is under vacuum (the purge column F4 is kept under vacuum by keeping valve 14 open while valves V13, V15 and V12 are closed).

A reflux liquid inlet 23b is positioned above the absorption column AD1 packing material PM2. A small portion of the output of the heat exchanger HE1 (typically a liquid acid waste) is tapped off at valve V11 and is pumped via pump P2 through line 108 to the top of the absorption column AD1 where the liquid acid waste then trickles down through the packing material PM2 forcing any vaporous materials back through the heat exchanger HE1.

D. Coolant System

The cooling system 5 shown in FIG. 5 is comprised of two interconnected closed-loop systems. A pump P4, which may be, for example, a single stage rotary pump in the preferred embodiment, circulates the coolant which is typically an oil (e.g., Dowtherm) in lines 114a and 114b and through the system which includes HE2 and C1. Temperature increases are provided by a variable heater H5 (variable heater H5 may be any conventional variably controlled heating means such as a variably controlled heating jacket which surrounds line 114b) with the temperature being monitored at an output of heater H5 by temperature sensor T13. The oil coolant is circulated through the coil 275 of the condenser C1 which is disposed within the tubular shell of the condenser C1. The coolant is also circulated through the jacket (tubular shell) of heat exchanger HE2. Both the input and the output to the coil 275 of condenser C1 are monitored with temperature sensors, including temperature sensor T13. Cooling water is circulated through the second system comprised of the heat exchanger HE1 and the heat exchanger HE2 and lines 115a and 115b. The cooling water circulates through the lines 115a and 115b and through the coils disposed within heat exchangers HE1 and HE2. Input valve IV1 and control valves V20a and V20b provide the cooling water to HE1 and to HE2 from an outside source of water, typically at room temperature. Temperature and flow sensors may be used to monitor temperature and flow parameters. The temperature of the water coolant may be altered at heat exchanger HE2 by varying the temperature of the oil coolant in the first system.

E. Vacuum Pump System

The pump system 6 is described in conjunction with FIG. 6. To attain vacuums of 5-10 Torr, the vacuum pump P5 may be an oil pump. The pump P5 is attached to an external, conventional gas scrubber. To protect the input of the vacuum pump P5, a conventional vapor trap VT3 is installed to trap any gaseous vapors that may come through the lines. The pressure is monitored by a conventional pressure control sensor PC1. Nitrogen gas ($N_2$) may be used to compensate the pressure reduction produced by the vacuum pump P5 by bleeding $N_2$ into the input of pump P5 through valve $VN_2$.

F. Quality Assurance System

Figure 7:
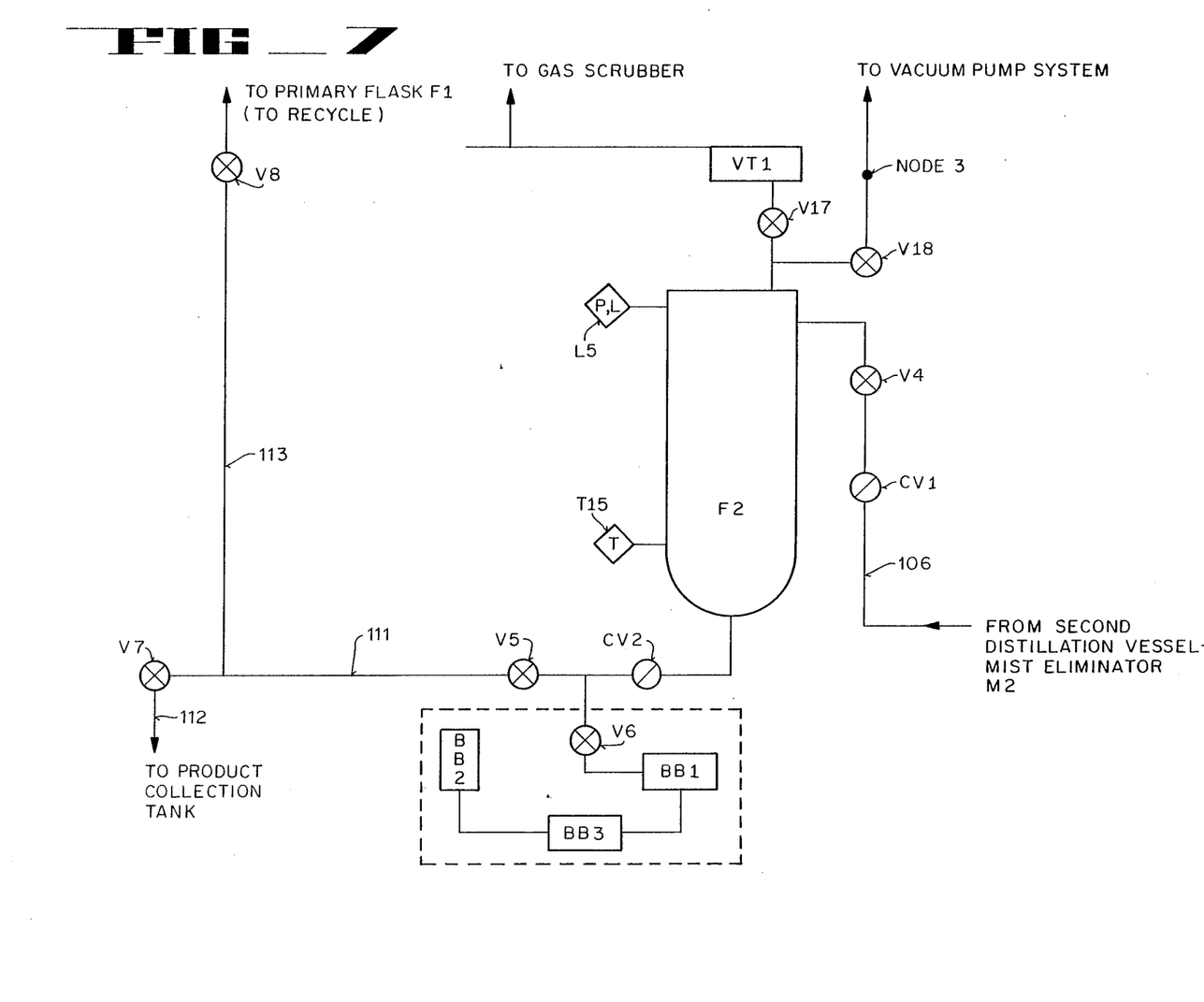
FIG. 7 is a block diagram of the product removal and quality assurance loop.

FIG. 7 shows the product removal and quality assurance system 7. The product exiting from the condenser C1 is directed through line 106 and the valves CV1 and V4 into the pre-product flask F2. The product may be driven by gravity to the flask F2. From an output line 111 of flask F2 a product sample is analyzed by a conventional particle counter BB1, by a conventional ion detector BB2, and a conventional density monitor BB3 measuring the particle count and metal contaminants remaining after the reprocessing cycle. If the analysis indicates levels that are not within desired specifications, the product is shunted through valve V8 into the input line 1 where it is recycled for reprocessing. If the analysis indicates levels that are within the desired specifications, then valves V5, V17, CV2 and V7 are opened (with valves V18, V4 and V8 closed) and the product drains from flask F2 into a product collection tank 8. Valve V17 is coupled to a venturi vacuum pump which is coupled to a conventional gas scrubber; opening valve V17 releases any pressure in flask F2, and allows a rough vacuum to be pulled using a vapor trap VT1 before opening V18 to reconnect to the vacuum system.

PART II

THE OPERATION

A. The Start-Up

When the system is initially set up or has been completely purged and cooled, an allotment of approximately several (e.g. 4) hours should be used to bring the system to operating temperature and pressure. The slow start-up is designed to minimize thermal stress to the system. Minimal stress lengthens the lifetime of the apparatus' components, which is desired from both an economic and safety standpoint. Components weakened by stress will be more likely to initiate a safety hazard or malfunctions.

Referring generally to FIGS. 1-7, the start-up operation proceeds as follows:

The front end of the process, i.e. the preliminary processing up to valve V1 is conducted at standard atmospheric pressure (760 Torr). The input line 1 is coupled to the pump P1 which pulls the feed from the line 101 through the input filter FI4 and input valve V9. A desired amount of feed is pumped into the flask F1 via line 101. After heating the feed by a heating means H1 to a temperature in the range of 175° C. (347° F.), the feed is drained through line 102 and valve V1 into the first distillation flask D1.

Once the feed is in distillation flask D1, valve V1 is closed and the heating means H2 slowly raises the temperature of the feed to an operating temperature of greater than 175° C. (347° F.). During the heating process at distillation means D1, the vacuum pump system 6 (vacuum generation means) decreases the pressure by means of the vacuum pump P5. Concurrent with this latter operation, i.e., increased temperature and decreased pressure, the oil coolant system 5 is started up and raised to an operating temperature of approximately 105° C. (221° F.).

The vacuum pump P5 pulls a vacuum in vessels D1 and D2 through the condenser C1 and the sludge column 255. The sludge column 255 is coupled to the vacuum pump system at node 2 as shown in FIGS. 4, 5 and 6; the purge column F4 is coupled to the vacuum pump system through valve V14 at node 2 as shown in FIGS. 4 and 6. The pre-product flask F2 is coupled to the vacuum pump system through valve V18 at node 3 as shown in FIGS. 6 and 7. It will be appreciated that during the generation of a vacuum in vessels D1 and D2, and in condenser C1 and sludge column 255, valves V1, V4 and CV1 are closed. After filling the flask D1 with spent piranha acid, valve V1 is closed to allow the generation of a vacuum. Similarly, valves V11, V12, V17, V5 (and CV2), V13 and V15 will normally be closed while generating a vacuum in vessels D1 and D2. The vacuum in D2 is generated through line 104, condenser C1, line 110, and the sludge column 255, and the vacuum in D1 is generated through line 103 and the sludge column 255. After the vacuum is generated to the operating levels specified below, the apparatus may be used in the standard mode of operation.

B. The Standard Mode of Operation

Referring to FIGS. 1-7, the standard mode of operation proceeds as follows:

The feed from input line 1 proceeds as previously described in Part II, (Start-Up) i.e. the feed is pumped into the flask F1, through the input filter FI4 and input valve V9. The input filter FI4 eliminates most of particulate matter greater than 100 microns prior to the actual distillation process.

The feed reservoir in flask F1 is maintained at standard atmospheric pressure and heated to a temperature of about 175° C. (347° F.). The temperature is maintained within this range by continuous monitoring of temperature sensor T1 and controlling a heating means H1 (e.g. a heating mantle) which surrounds the flask F1.

Through valve V1 via line 102, the feed is collected in the first distillation flask D1. After the flask D1 is filled, the valve V1 is closed to allow for the vacuum to be stabilized in flask D1. In the first distillation flask D1, the temperature range is maintained between 149° C.–204° C. (300° F.–400° F.), and the operating pressure is decreased to a range of 5-25 Torr.

In the first distillation flask D1, the lower boiling point compounds such as water and unreduced compounds are separated from the acid. The distillation column DC1 attached to the flask D1 is packed with a column packing means PM1 (e.g. glass rings or beads, such as Rashig rings). As the mixture in flask D1 is heated, the water is boiled off, rising into the packed column of D1 and exiting at the uppermost outlet into line 103 after passing through a mist eliminator M1. However, as the $H_2SO_4$ and $H_2O$ rise into the column it is mixed with a trickle of de-ionized water provided through an input pipe 23a at the top of the packed column DC1, thereby causing the $H_2SO_4$ to be recondensed into the distillation mixture within the flask D1. After the acid has reached the desired (e.g. 97%) concentration the valve V2 is opened and distillation mixture is drained through line 107 and valve V2 into the larger second distillation flask D2 where the next step of the process commences. After filling flask D2, the valve V2 is closed. The second distillation flask D2 is maintained at a higher temperature range of approximately 190° C. –218° C. (375° F. –425° F.) at a lower pressure of approximately 5 Torr. In addition to the heating means H3 which surrounds the flask D2, several smaller heating means H4a-c are positioned within the distillation flask D2. To provide for more efficient agitation of the distillation mixture, a stirrer ST1 is also included in the distillation flask D2.

In the second distillation, high purity $H_2SO_4$ is distilled. The higher boiling compounds (e.g., heavy metals) are retained in the bottom of the distillation flask D2.

Decreasing the pressure, particularly in flask D2, decreases the boiling point of the $H_2SO_4$, thus allowing the system to be operated at a lower temperature. Lowering the pressure also lowers the density of the product gas. Decreasing the temperature causes the differential between chemical activities of the $H_2SO_4$ and of the heavier sludge to increase. As the difference of the two activities is increased the likelihood of increased product purity is also increased. Since the density of the gas and therefore the terminal velocity of the particles (e.g. particulate contaminants) is decreased, the ability of the particles to escape the liquid phase is reduced. Therefore, the particles remain within the distillation mixture within the flask D2. In addition to the particles in the distillation mixture, the sludge contains (metals) compounds that boil at a higher temperature. These metal compounds have a greater dependency on temperature changes. Thus as the pressure is decreased, the boiling points of the sludge and the $H_2SO_4$ change at different rates. The different dependencies increase the ability to separate the desired $H_2SO_4$ from the metal compound contaminants.

As the $H_2SO_4$ in flask D2 is converted into the gaseous (g) form, it rises through the distillation column DC2 which caps the distillation flask D2 and rises through the mist eliminator M2. The $H_2SO_4$ (g) flows out of the distillation column DC2 via line 104 and into the primary condenser C1 at which point the gaseous $H_2SO_4$ condenses into highly pure liquid $H_2SO_4$ which flows into a lower reservoir of the primary condenser C1. However, the temperature of the product is still elevated beyond that of room temperature and the product remains in the condenser C1 until the product is drained from the condenser C1 into the flask F2 through line 106. The condenser C1 is drained usually only when the flask F2 is kept under a vacuum. Thus, if any product has previously been drained into flask F2, that product in F2 will be under vacuum (valve 18 open while valves V17, CV2 and V5 are closed). The condenser C1 is drained (by gravity feed) when valve V4 is opened after a vacuum has been established in flask F2; after filling flask F2 to the desired level, valves V4 and CV1 are closed. The product may be drained by gravity feed from flask F2 while continuing an ongoing distillation by closing V18 (and assuring that valve V4 is closed) and by opening valve V17 to bring the pressure in flask F2 back to atmospheric pressure. After draining the desired amount of product from flask F2 through line 111 and valves V5 and CV2, the flask F2 is again depressurized to produce a vacuum in flask F2 (by closing valves V17, CV2 and V5 and by opening valve 18).

The distillation mixture remaining in D2 is coupled through line 105 and valve V3 to an input of the sludge column 255. When the operator desires to empty D2, the valve V3 is opened and the sludge and other materials remaining in D2 escape from D2, flow through line 105, and enter the heat exchanger means HE1 at the lower portion of the sludge column 255. The sludge column 255 also has an input from the condenser C1 via line 110 and has an input from the gaseous output of vessel D1 via line 103. Line 103 provides water and other low boiling compounds from vessel D1 into the sludge column 255; the water from vessel D1 tends to dilute the sludge from vessel D2.

The diluted sludge rests in the heat exchanger means HE1 in the bottom of the sludge column until the sludge column 255 is drained by opening valve V11. The diluted sludge, which is typically a weak acid, is recirculated through the sludge column 255 by pumping (by pump P2) a slow trickle of the diluted sludge through line 108 (and open valve V10). The diluted sludge trickles from the input pipe 23b and through the packing material PM2 of the absorption column AD1 and back into the heat exchanger HE1. The trickling of diluted sludge through the sludge column 255 tends to absorb any vapor and keep it within the column 255. The coil 256 of the heat exchanger HE1 tends to cool the sludge mixture (while heating the water coolant) and thereby heating cooling water which flows through the tubular shell of the heat exchanger HE2.

During an on-going distillation, the sludge column 255 is drained by filling (via gravity feed) the purge column F4 while the column F4 is kept under vacuum. Column F4 is kept under vacuum during normal distillation operations by keeping valve V14 open while valves V12, V13 and V15 are closed. When valve V11 is opened while column F4 is under vacuum, the diluted sludge from the sludge column 255 flows (by gravity) through line 109 into the column F4. Typically, column F4 is positioned relative to column 255 so that some diluted sludge remains in the column 255 to cover the coil 256. After draining a desired amount of diluted sludge into the purge column F4, valve V11 is closed.

During an on-going distillation, the purge column F4 may be drained by opening valves V12, V13, and V15 while closing valve 14 (valve V11 will of course also be closed). The diluted sludge from F4 is pumped by pump P3 to a waste collection tank.

Figure 8:
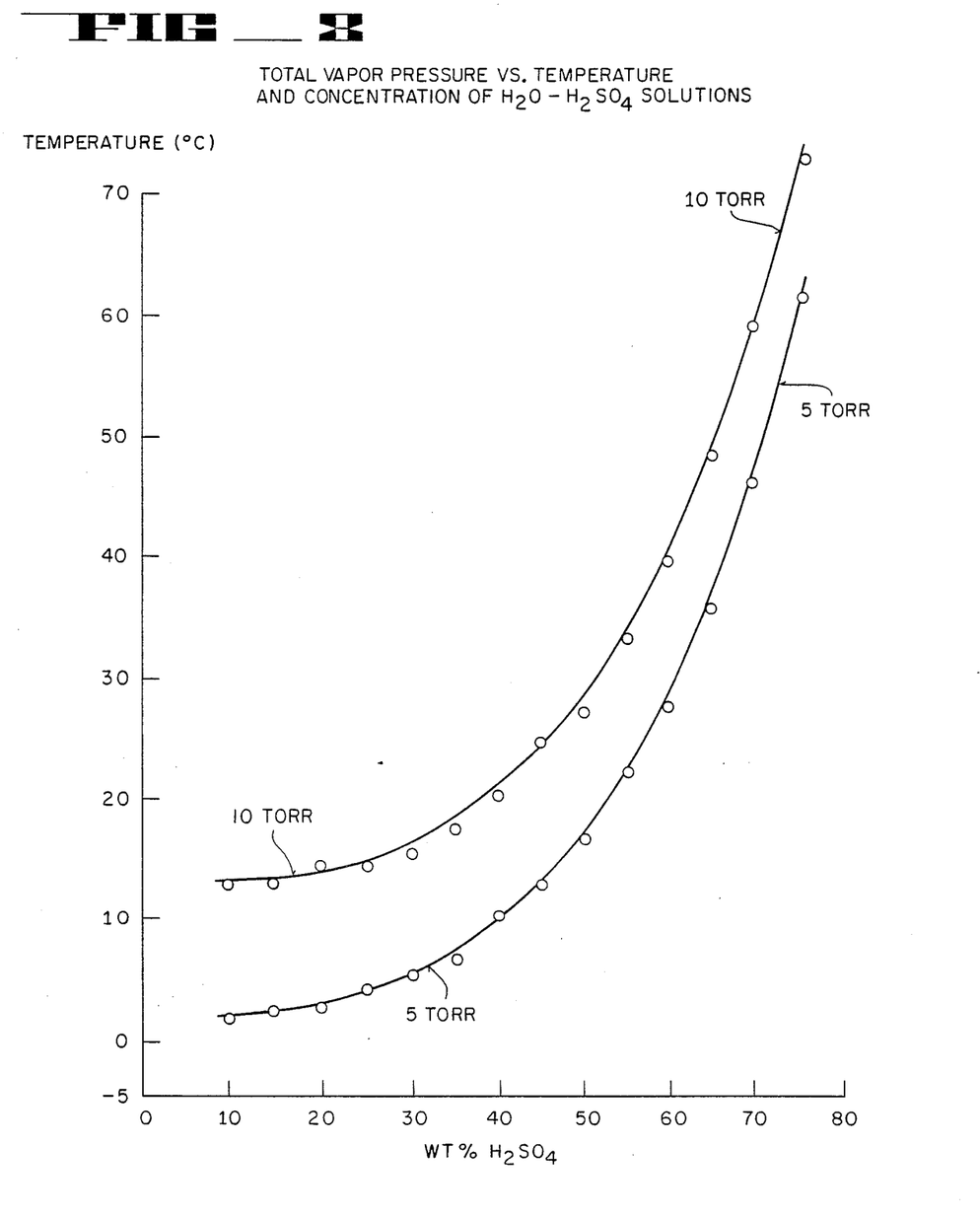
FIG. 8 is a chart showing the relationship between the vacuum pressure in the distillation system at various temperatures and concentrations of the dilute acid reflux in the column 255.

The dilute acid (diluted sludge) which is trickled (refluxed) through the sludge column 255 will have an impact on the vacuum pressure in the distillation system, including the vacuum pressure in the vessel D2. Specifically, the amount and temperature of the trickle (reflux) through column 255 will set a minimum limit on the vacuum pressure; up to a certain point at a given temperature of the reflux, a greater amount of reflux will allow a lower vacuum pressure to be attained. Therefore the amount of reflux and the pump P2 should be adjusted to allow achievement of the vacuum levels set forth above, particularly in vessel D2. The temperature of the reflux in column 255 will also have an even more significant impact on the vacuum pressure by setting a minimum limit on the vacuum pressure. At a given reflux concentration and pressure, a lower temperature for the reflux through column 255 will permit a lower vacuum pressure to be obtained. FIG. 8 shows, for two given pressures (5 and 10 torr) in the column 255, what temperature the reflux (of a particular concentration) should be kept at in order to obtain the desired vacuum of 5 or 10 torr. For example, if the desired vacuum is 5 torr and the dilute acid concentration (by percent weight of $H_2SO_4$) is 50%, then the dilute acid reflux should be kept at about 15° C. In practice, the temperature of the reflux is controlled largely by controlling the temperature of the cooling water which flows through the coil 256 of HE1 or by controlling the size of HE1. The reflux of dilute acid in column 255 serves as a means for setting the minimum vacuum pressure in the distillation system. Alternatively, the reflux of dilute acid through the column 255 may be replaced by a condenser coil located near the top of the column 255, which coil acts as a means for setting the minimum pressure. This condenser coil (through which a coolant flows) may be provided near the top of the column 255 instead of the column packing AD1 and instead of the reflux input 23b. The condenser coil would work in the same fashion as the reflux of dilute acid; specifically, a lower temperature for the condenser coil (at a given concentration of dilute acid in column 255) permits a lower (minimum) vacuum pressure to be attained.

C. Quality Assurance

Referring to FIGS. 2 and 7, the in-line quality assurance loop is described. The in-line quality assurance system 7 is the most reliable way to obtain an accurate particle count (BB1), since the sampling is taken directly from the distillation column rather than removing the liquid product from the receiving tank T2 where the possibility of handling contamination is increased.

The product received in the pre-product flask F2 is monitored by temperature sensor T15 and level sensor L5. Once the desired level of product in flask F2 is attained, some of the product is drained through valve CV2 and valve V6 into the quality assurance loop. Once a sufficient amount of the product is through valve V6, valve V6 is closed and the product is processed in the conventional particle counter BB1, a conventional density monitor BB3 and finally in a conventional metal ion measurement device (e.g., ion chromatograph BB2).

If the purity is within the desired specifications valve V18 is closed and valves V5 and CV2 are opened and the product in the pre-product flask F2 drains into the product collection tank T-3 through line 111, valve V7 and line 112.

D. Recycling

If the purity as determined by the quality assurance system 7 is not within the desired specifications, the product in pre-product flask F2 is recycled back into the feed line 1 through line 111 and line 113 by opening valve V8 while keeping valve V7 closed. This allows the product not meeting the requisite purity standard to be recycled through the distillation process.

We claim:

1. An acid reprocessor for reprocessing waste piranha containing contaminated sulfuric acid ($H_2SO_4$) from a semiconductor processing operation, said acid reprocessor comprising:

an input flask means for receiving said waste piranha containing contaminated $H_2SO_4$, light boiling contaminants, water and particulates, said input flask means including a first heating means for heating said waste piranha, said input flask means having an output for outputting said waste piranha;

a first distillation means having an input coupled to said output of said input flask means to receive said waste piranha and having a gaseous output being coupled to a first column packed with a column packing means, said first distillation means having a second heating means for heating said waste piranha to boil off said water and said light boiling contaminants from said waste piranha to produce an enriched acid, said contaminants escaping from said gaseous output through said first column and through a mist eliminator means of said first distillation means, said first column having an input to receive reflux liquid which is trickled through said column to retard loss of $H_2SO_4$ in said first distillation means, said first distillation means having a feed output for providing said enriched acid;

a second distillation means having an input coupled to said feed output for receiving said enriched acid, said second distillation means having a third heating means for heating said enriched acid to boil off substantially pure $H_2SO_4$, through a second column leaving an acid waste sludge in said second distillation means, said second distillation means having a first output for providing said substantially pure $H_2SO_4$, said first output being coupled to a tubular shell of a condenser to condense said substantially pure $H_2SO_4$, said condenser having a first coil through which a coolant flows to cool the substantially pure $H_2SO_4$ which flows through said tubular shell, said second distillation means having a second output for removing said acid waste sludge from said second distillation means, said second distillation means having a structure being comprised of substantially of borosilicate glass;

a heat exchanger means having a cooling means including a second coil through which a coolant flows and having a first input coupled to said gaseous output of said first distillation means to receive said water and said light boiling contaminants escaping from said first distillation means and having a second input coupled to said second output of said second distillation means to receive said acid waste sludge, said heat exchanger means having a third column packed with column packing means and having an input to receive waste acid which is trickled through said third column;

a vacuum generation means coupled to provide a vacuum in said first distillation means and in said second distillation means, said vacuum generation means producing a vacuum in said second distillation means to reduce said particulates of said substantially pure $H_2SO_4$, whereby said acid reprocessor provides a reprocessed semiconductor grade $H_2SO_4$ from waste piranha of a semiconductor processing operation.

2. The acid reprocessor as described in claim 1 wherein said input to receive waste acid which is trickled through said third column provides a means for setting the minimum vacuum pressure in the distillation system and wherein said first distillation means is a structure being comprised substantially of borosilicate glass.

3. A method for reprocessing waste piranha containing contaminated sulfuric acid ($H_2SO_4$) in an acid reprocessor, said method comprising the steps of:

receiving said waste piranha containing contaminated $H_2SO_4$, light boiling contaminants, water and particulates in an input flask means having a first heating means for heating said waste piranha, and outputting said waste piranha from an output of said input flask means;

first distilling said waste piranha in a first distillation means having an input coupled to said output of said input flask means to receive said waste piranha and having an gaseous output coupled to a first column packed with a packing material comprised of glass rings and a first mist eliminator means coupled to the output of said first column, said first distillation means having a second heating means;

heating said waste piranha by said second heating means such that water is boiled off from said waste piranha to produce an enriched waste piranha, said water escaping said first distillation means from said gaseous output through said packing material in said first column of said first distillation means and then through said first mist eliminator means;

refluxing liquid that is trickled through a reflux input of said first column to retard distillation of $H_2SO_4$ in said first distillation means, wherein said first distillation means has a feed output for said enriched waste piranha;

second distilling in a second distillation means having an input coupled to the output of said first distillation means for receiving said enriched waste piranha, said second distillation means having a third heating means;

heating said enriched waste piranha with said third heating means and vaporizing substantially pure $H_2SO_4$ from said enriched waste piranha through a second column leaving an acid waste sludge remaining in said second distillation means;

collecting a substantially pure $H_2SO_4$ liquid after said substantially pure $H_2SO_4$ vapor ascends through said second column and a second mist eliminator coupled to the output of said second column and condenses in a condensing means;

generating a vacuum that reduces the operating pressure in said first distillation means and said second distillation means with a vacuum generation means coupled to said first distillation means and to said second distillation means;

reducing said particulates of said substantially pure $H_2SO_4$ vapor by adjusting said operating pressure, thus decreasing the density of said substantially pure H₂SO₄ vapor and decreasing the terminal velocity of said particulates, such that said particulates remains in said acid waste sludge;

removing said acid waste sludge from said second distillation means through a second feed output into a waste collection tank.

4. The method for reprocessing waste piranha as described in claim 3 wherein said vacuum generating step further includes receiving water escaping form said first distilling step into a first input of a heat exchanging means, simultaneously receiving said acid waste sludge from said second distilling step into a second input of said heat exchanging means and trickling waste acid through a third input at the top of said heat exchanging means for setting the minimum pressure in said first and second distillation means.

5. The method for reprocessing waste piranha as described in claim 4 wherein said first distillation means and said second distillation means are structures comprised substantially of borosilicate glass.

6. An acid reprocessor for reprocessing waste piranha containing contaminated H₂SO₄ from a semiconductor processing operation, said acid reprocessor comprising:

an input flask means for receiving said waste piranha containing contaminated H₂SO₄ light boiling contaminants, particulates and water, said input flask means having an output for outputting said waste piranha;

a first distillation means having an input coupled to said output of said input flask means to receive said waste piranha and having a gaseous output being coupled to a first column packed with a column packing means, a first heating means for heating said waste piranha in said first distillation means to boil off water and other light boiling contaminates from said waste piranha to produce an enriched acid, said light boiling contaminates and water escaping from said gaseous output through said first column of said first distillation means, an input in said first column to receive reflux liquid which is trickled through said first column to retard loss of H₂SO₄ in said first distillation means, a feed output from said distillation means for said enriched acid;

a second distillation means having an input coupled to said feed output for receiving said enriched acid, a second heating means for heating said enriched acid in said second distillation means to boil off substantially pure H₂SO₄, through a second column leaving an acid waste sludge in said second distillation means, said second distillation means having a first output for providing said substantially pure H₂SO₄, said first output being coupled to a condenser to condense said substantially pure H₂SO₄, said second distillation means having a second output for removing said acid waste sludge from said second distillation means;

a vacuum generation means coupled to said first and second distillation means, providing a reduced operating pressure in said first and second distillation means, such that said particulates remain in said acid waste sludge;

a heat exchanger means having a third column and a cooling means, said heat exchanger means having a first input coupled to said gaseous output of said first distillation means to receive said water and said light boiling contaminants from said first distillation means and having a second input coupled to said second output of said second distillation means to receive said acid waste sludge, said cooling means including a first chamber through which a coolant flows to cool said acid waste sludge, said third column being packed with a column packing means and being coupled to said vacuum generation means to provide said reduced operating pressure in said first and said second distillation means, said third column having a third input to receive a waste acid which is trickled through said third column, such that said third input provides a means for setting the minimum vacuum pressure in the distillation system and for removing any acid vapor from a vapor stream created in said heat exchanger means, said heat exchanger being coupled to said waste collection tank to provide for removal of said acid waste sludge from said second distillation means through said second output of said second distillation means;

a waste collection tank providing for removal of said acid waste sludge from said second distillation means through said second output.

7. The acid reprocessor as described in claim 6 wherein said first distillation means, said second distillation means and said heat exchanger means are comprised substantially of borosilicate glass.

8. An acid reprocessor for reprocessing waste piranha containing contaminated H₂SO₄ from a semiconductor processing operation, said acid reprocessor comprising:

an input flask means for receiving said waste piranha containing contaminated H₂SO₄, light boiling contaminants, particulates and water, said input flask means having an output for outputting said waste piranha:

a first distillation means having an input coupled to said output of said input flask means to receive said waste piranha and having a gaseous output being coupled to a first column packed with a column packing means, a first heating means for heating said waste piranha to boil off water and other light boiling contaminants from said waste piranha to produce an enriched acid, said light boiling contaminants and water escaping from said gaseous output through said first column of said first distillation means, a feed output from said first distillation means for said enriched acid;

a second distillation means having an input coupled to said feed output for receiving said enriched acid, a second heating means for heating said enriched acid in said second distillation means to boil off substantially pure H₂SO₄, through a second column leaving an acid waste sludge in said second distillation means, said second distillation means having a first output for providing said substantially pure H₂SO₄, said first output being coupled to a condenser to condense said substantially pure H₂SO₄, said second distillation means having a second output for removing said acid waste sludge from said second distillation means;

a vacuum generation means coupled to said first and second distillation means, providing a reduced operating pressure in said first and second distillation means, such that said particulates remain in said acid waste sludge;

a heat exchanger means having a third column and a cooling means, said heat exchanger means having a first input coupled to said gaseous output of said first distillation means to receive said water and said light boiling contaminants from said first distillation means and having a second input coupled to said second output of said second distillation means to receive said acid waste sludge, said cooling means including a first chamber through which a coolant flows to cool said acid waste sludge, said third column being packed with a column packing means and being coupled to said vacuum generation means to provide said reduced operating pressure in said first and said second distillation means, said third column having a third input to receive a waste acid which is trickled through said third column, such that said third input provides a means for setting the minimum vacuum pressure in the distillation system and for removing any acid vapor from a vapor stream created in said heat exchanger means.

* * * * *